United States Patent
Sim et al.

(10) Patent No.: US 10,241,938 B1
(45) Date of Patent: Mar. 26, 2019

(54) OUTPUT DATA PATH FOR NON-VOLATILE MEMORY

(71) Applicant: SanDisk Technologies LLC, Plano, TX (US)

(72) Inventors: Yukeun Sim, Santa Clara, CA (US); Yingchang Chen, Cupertino, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/849,413

(22) Filed: Dec. 20, 2017

(51) Int. Cl.
G06F 13/42 (2006.01)
G06F 13/16 (2006.01)
G06F 12/02 (2006.01)

(52) U.S. Cl.
CPC ........ *G06F 13/161* (2013.01); *G06F 12/0238* (2013.01); *G06F 13/1673* (2013.01); *G06F 13/1678* (2013.01); *G06F 13/4239* (2013.01); *G06F 2212/202* (2013.01)

(58) Field of Classification Search
CPC ............ G06F 13/4239; G06F 13/1673; G06F 13/4291; G06F 13/1678; G06F 13/161; G06F 1/12
See application file for complete search history.

(56) References Cited

U.S. PATENT DOCUMENTS

| 8,225,016 | B2 | 7/2012 | Rashid |
| 9,411,722 | B2 | 8/2016 | Yap |
| 9,576,626 | B2 | 2/2017 | Jang et al. |
| 2013/0254583 | A1* | 9/2013 | Rifani ............... G06F 13/4291 713/400 |
| 2016/0124889 | A1* | 5/2016 | Singh ............... G06F 13/4239 710/310 |

FOREIGN PATENT DOCUMENTS

WO      2009079014 A1    6/2009

* cited by examiner

*Primary Examiner* — Ernest Unelus
(74) *Attorney, Agent, or Firm* — Kunzler, PC

(57) ABSTRACT

Apparatuses, systems, and methods are disclosed for an output data path for non-volatile memory. A buffer may include a plurality of buffer stages. A buffer stage width may be a width of an internal bus for a non-volatile memory element. A buffer may include two or more read pointers, updated by an internal controller at different times in response to different portions of a clock signal. A parallel-in serial-out (PISO) component may receive data via an internal data path having a data path width equal to an internal bus width, and may output the data in a series of transfers controlled according to a clock signal, via an output bus having an output bus width narrower than an internal bus width. A PISO component may receive data from a portion of a buffer stage in response to an internal controller updating a read pointer to point to the buffer stage.

19 Claims, 8 Drawing Sheets

US 10,241,938 B1

OUTPUT DATA PATH FOR NON-VOLATILE MEMORY

TECHNICAL FIELD

The present disclosure, in various embodiments, relates to non-volatile memory and more particularly relates to an output data path for non-volatile memory.

BACKGROUND

The amount of time it takes for a non-volatile memory element to service or perform a storage operation may include time spent actually sensing or changing physical properties of non-volatile storage cells to read or write the data, time spent transferring the data on a data bus, and additional latency in the data path for moving data internally within the non-volatile memory element. As speeds increase for non-volatile media and for data buses, less time is spent actually reading and transferring the data, and the data path latency becomes more significant. Additionally, the significance of data path latency is further increased as access is provided to data in smaller units (e.g., in a manner more like a fast byte-addressable volatile memory and less like a slow, sector-addressable hard drive). For example, a latency period that may be reasonable for an operation that provides access to a large block of data may be far too long for an operation that provides access to a few bytes of data in a small burst.

SUMMARY

Apparatuses are presented for outputting data for non-volatile memory. In one embodiment, a buffer for output data of a non-volatile memory element includes a plurality of buffer stages. In a certain embodiment, a buffer stage width may be a width of an internal bus for a non-volatile memory element. In a further embodiment, a buffer may include two or more read pointers. In one embodiment, an internal controller for a non-volatile memory element may update two or more read pointers at different times in response to different portions of a clock signal. In one embodiment, a parallel-in serial-out (PISO) component receives data via an internal data path having a data path width equal to an internal bus width, and outputs the data in a series of transfers controlled according to a clock signal, via an output bus having an output bus width narrower than an internal bus width. In a certain embodiment, a PISO component receives data from a portion of a buffer stage in response to an internal controller updating a read pointer to point to the buffer stage.

Systems are presented for non-volatile memory. In one embodiment, a system includes one or more non-volatile memory elements. In a certain embodiment, a non-volatile memory element includes a plurality of buffer stages for output data of the non-volatile memory element. In a further embodiment, a non-volatile memory element includes a parallel-in serial-out (PISO) component that receives data from a buffer stage via PISO input lines and outputs the data in a series of transfers controlled according to a read enable clock signal, via PISO output lines. In certain embodiments, a PISO component comprises more PISO input lines than PISO output lines. In one embodiment, a non-volatile memory element includes an early read pointer and a later read pointer. In certain embodiments, an internal controller for a non-volatile memory element updates an early read pointer and a later read pointer in response to different portions of a read enable clock signal. In further embodiments, an internal controller couples an early portion of a buffer stage to a first subset of PISO input lines by updating an early read pointer to point to the buffer stage. In a certain embodiment, an internal controller couples a later portion of a buffer stage to a second subset of PISO input lines by updating a later read pointer to point to the buffer stage.

An apparatus, in another embodiment, includes means for buffering output data of a non-volatile memory element in buffer stages of a buffer stage width. In a certain embodiment, an apparatus includes means for outputting data at an output data width narrower than a buffer stage width. In a further embodiment, an apparatus includes means for coupling buffer stage portions to a means for outputting data. In a certain embodiment, means for coupling may include two or more read pointers.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
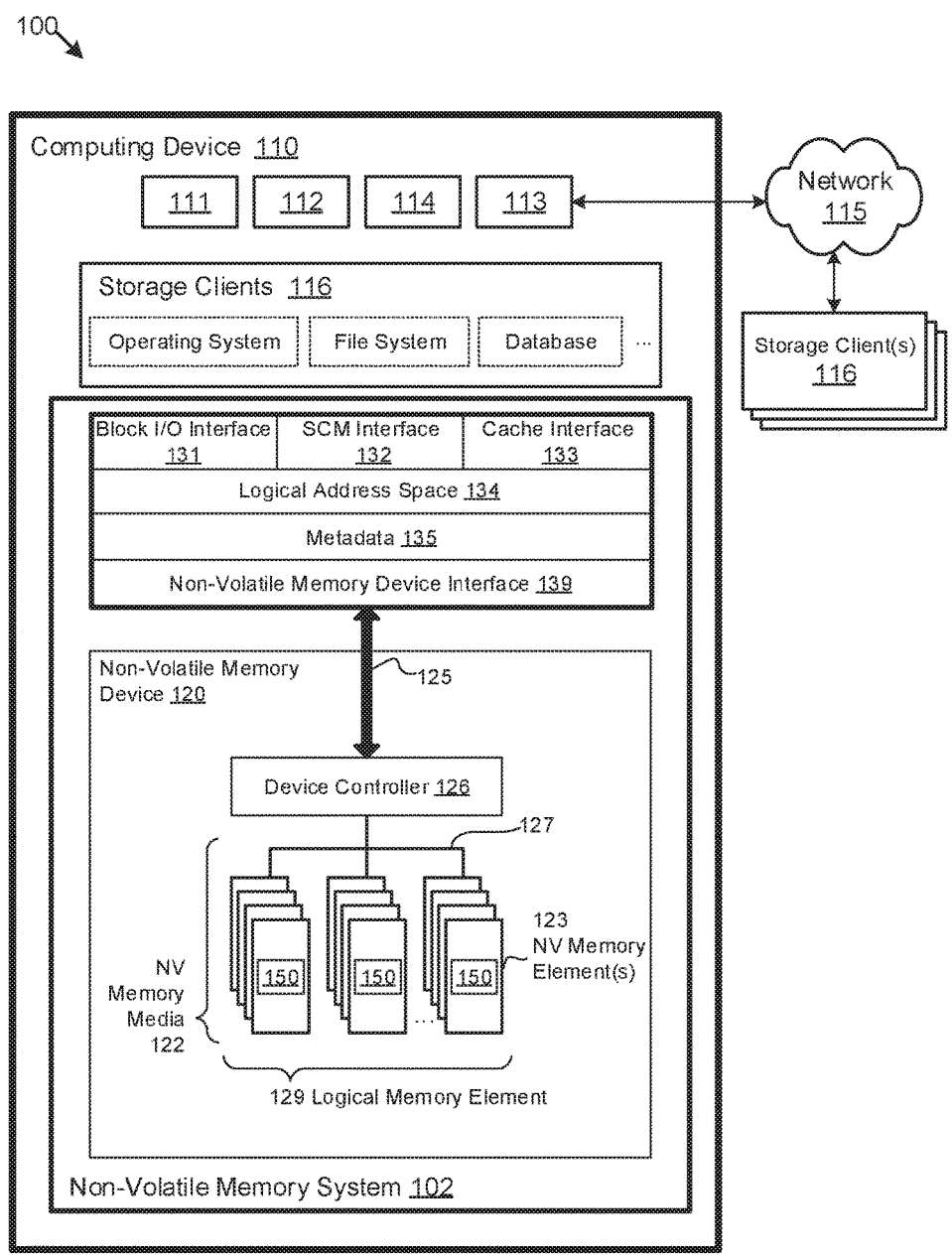
FIG. 1 is a schematic block diagram illustrating one embodiment of a system comprising one or more non-volatile memory elements.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, resistive (e.g., resistive random access memory (ReRAM), memory resistor (Memristor) memory, programmable metallization cell memory, phase-change memory (PCM, PCME, PRAM, PCRAM, ovonic unified memory, chalcogenide RAM, or C-RAM), or the like), or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising non-volatile memory elements 123 with output data paths 150. An output data path 150 may be part of a non-volatile memory element 123, and may be in communication with a device controller 126 external to the non-volatile memory elements 123, a device driver, or the like. Output data paths 150 may be part of a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein.

In the depicted embodiment, the non-volatile memory elements 123 include output data paths 150. In a certain embodiment, an output data path 150 may include a buffer for output data of a non-volatile memory element 123, and a parallel-in serial-out (PISO) component. The buffer, in certain embodiments, may include a plurality of buffer stages, where a buffer stage width is an internal bus width. The PISO component, in certain embodiments, may receive data from a buffer stage via an internal bus, and output the data in a series of transfers via an output bus narrower than the internal bus. In certain embodiments, the buffer may include two or more read pointers that are updated at different times. The PISO component may receive data from a portion of a buffer stage when a read pointer is updated to point to the buffer stage. In certain embodiments, using multiple read pointers to transfer data to a PISO component from a buffer stage in portions may provide high data throughput with low latency, compared to using a buffer with a single read pointer. Output data paths 150 are described in further detail below with regard to FIGS. 2-10.

In one embodiment, an output data path 150 may include logic hardware of one or more non-volatile memory devices 120, such as a device controller 126, a non-volatile memory element 123, other programmable logic, firmware for a for a non-volatile memory element 123, microcode for execution by a non-volatile memory element 123, or the like. In another embodiment, an output data path 150 may include executable software code, stored on a computer readable storage medium for execution by logic hardware of a non-volatile memory element 123. In a further embodiment, an output data path 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: resistive random access memory (ReRAM), Memristor memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element 123, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements 123.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
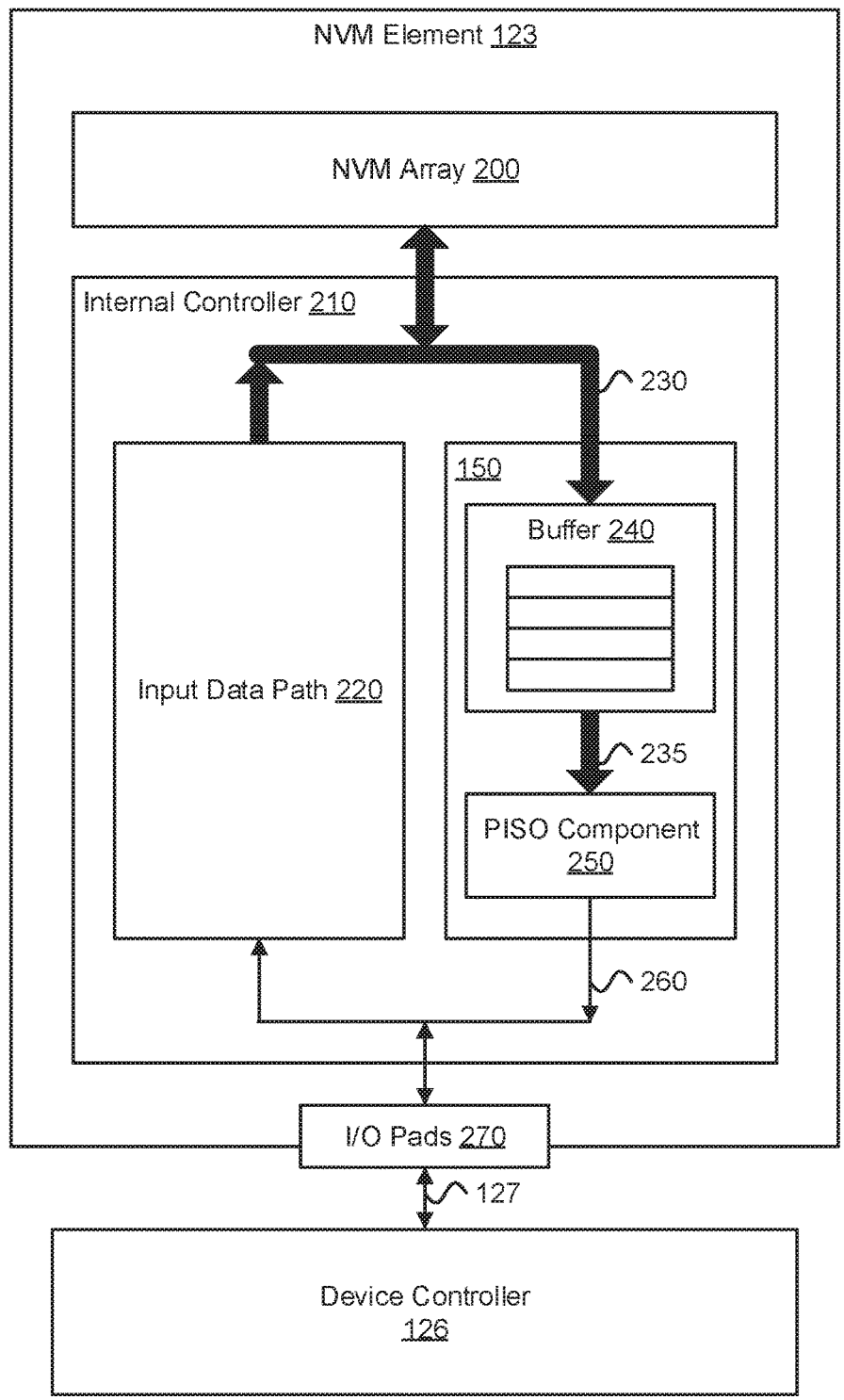
FIG. 2 is a schematic block diagram illustrating one embodiment of a non-volatile memory element, including one embodiment of an output data path.

FIG. 2 depicts one embodiment of a non-volatile memory element 123, in communication with a device controller 126. The device controller 126 and the non-volatile memory element 123 may be substantially as described above with regard to FIG. 1. In one embodiment, the device controller 126 may include a hardware controller for a storage device including the non-volatile memory elements 123. In another embodiment, the device controller 126 may include a device driver for a storage device including the non-volatile memory elements 123, and the device driver may include logic hardware and/or executable code stored on one or more computer readable storage media. In certain embodiments, the non-volatile memory element 123 may be a chip, a die, a package, a die plane, or the like. Although a single non-volatile memory element 123 is depicted in FIG. 2, a device controller 126 may be coupled to or in communication with multiple non-volatile memory element 123 for a non-volatile memory device 120. In the depicted embodiment, the non-volatile memory element 123 includes a non-volatile memory array 200, an internal controller 210, and I/O pads 270.

In various embodiments, a non-volatile memory array 200 may be a two-dimensional or three-dimensional array of non-volatile memory cells. The internal controller 210 communicates with the non-volatile memory array 200 via an internal bus 230 to perform storage operations, such as reading, writing, erasing, and the like, using the array 200. In certain embodiments, a "cell" of the array 200 may refer to a smallest or fundamental physical unit of memory, or storage, for an array 200, and may be referred to interchangeably as a "storage cell," a "memory cell" or the like. For example, a cell may be a floating gate transistor for NAND flash memory, a memristor for resistive memory, or the like. Thus, in a further embodiment, an array 200 of cells may be a two-dimensional grid, a three-dimensional block, a group, or other similar set of cells where data can be physically stored, for short-term memory use, long-term storage use, or the like. In certain embodiments, a non-volatile memory element 123 may include further or peripheral components in addition to the array 200, such as word line drivers, sense amplifiers for bit lines, latches to store data that is being read from or written to the array 200, and the like.

The internal controller 210, in certain embodiments may be a controller internal to the non-volatile memory element 123 (e.g., an on-die controller for a memory die), as distinct from the device controller 126, which is external to the non-volatile memory element 123. In various embodiments, an internal controller 210 may include various electronic components and/or circuits, including logic components, data storage components, and the like. The device controller 126 may select a non-volatile memory element 123 (such as the depicted element or another element) as a target for a storage operation, and may communicate with the internal controller 210 for the selected element, to send command and address information and to transfer (e.g., send or receive) data for storage operations on the selected element. The internal controller 210 may communicate with the array 200 via an internal bus 230 for the non-volatile memory element 123, and may communicate with the device controller 126 via an external bus 127.

The external bus 127, in one embodiment, may be substantially similar to the bus 127 described above with reference to FIG. 1. Input/output pads 270 may comprise electrical connectors or contacts for the external bus 127. Although one external bus 127 and one set of input/output pads 270 are depicted in FIG. 2, a non-volatile memory element 123 in another embodiment may include more than one set of input/output pads 270 and may communicate with the device controller 126 via more than one external bus 127. For example, in one embodiment, a first bus 127 and a first set of input/output pads 270 may communicate command/address information from the device controller 126 to the non-volatile memory element 123, and a second bus 127 and a second set of input/output pads 270 may communicate data between the device controller 126 and the non-volatile memory element 123. Various ways of communicating command/address information and data between a non-volatile memory element 123 and a device controller 126 will be clear in view of this disclosure.

The internal controller 210 in certain embodiments, includes an input data path 220 and an output data path 150. In various embodiments, a data path 220, 150 may include one or more circuits, components, or the like, that store, transmit, and/or transform data between a device controller 126 and a non-volatile memory array 200. For example, in one embodiment, an input data path 220 may include an encoder for an error-correcting code, and an output data path 150 may include a corresponding decoder. Various other corresponding components for transforming data and for reversing data transformations, which may be included in the input data path 220 and the output data path 150, will be clear in view of this disclosure.

An input data path 220, in various embodiments, may buffer, transmit, and/or transform data to be written to the array 200. The input data path 220 may receive data from the device controller 126 via the external bus 127, may store the data in a buffer, transform the data by encoding, compressing, whitening, or the like prior to storage, and may send the data to the array 200 via an internal bus 230. In certain embodiments, the internal bus 230 may be wider than the external bus 127, and the input data path 220 may include a serial-in parallel-out (SIPO) component that receives multiple data transfers via the external bus 127 and parallelizes the data for transmission on the internal bus 230. Various further embodiments of an input data path 220 will be clear in view of this disclosure. Additionally, an internal controller 210 for a non-volatile memory element 123 may include components other than an input data path 220 and an output data path 150. For example, a command/address path may communicate with the input data path 220 and an output data path 150 to coordinate the flow of data.

An output data path 150, in various embodiments, may buffer, transmit, and/or transform data that has been read from the array 200. The output data path 150 may receive data from the array 200 via the internal bus 230, may store the data in a buffer 240, and may use a PISO component 250 to serialize the data for output to the device controller 126 via the input/output pads 270 and the external bus 127. Various further embodiments of an output data path 150 will be clear in view of this disclosure. The buffer 240 and the PISO component 250 are described in further detail below.

In the depicted embodiment, the buffer 240 stores, buffers, or queues output data for the non-volatile memory element 123. The internal controller 210 may read data from the array 200 in response to a read command, and store the data in a buffer 240 prior to output. In the depicted embodiment, the buffer 240 includes a plurality of buffer stages. A "buffer stage," in various embodiments, may be a row or other array of latches, flip-flops, or other data storage components that receive data from the internal bus 230 in parallel. In certain embodiments, a buffer stage width (e.g., a number of bits stored per buffer stage) may be a width of the internal bus 230 for the non-volatile memory element 123. The buffer stage width may refer to a number of bits stored per buffer stage, and a bus width may refer to a number of bits communicated per transfer for a bus. A transfer may be a clock cycle for a single data rate bus, half a clock cycle for a double data rate bus or the like. Thus, in certain embodiments, a bus may be a group of electrical conductors or lines, and a bus width may be the number of independent data lines for a bus (e.g., not counting conductors that are grounded, or that carry clock signals, or the like).

For example, in one embodiment, the internal bus 230 may be a 64-bit bus, which transfers 64 bits at a time, in parallel, and the buffer stages may be 64 bits wide, so that one buffer stage stores data from one transfer. As a further example, a buffer stage may be a row of 64 latches coupled to the internal bus 230, and a write pointer for the buffer 240 may enable the row of latches for receiving data from the internal bus 230, while preventing other rows of latches or buffer stages from receiving that data transfer. In another embodiment, the internal bus width may be 32 bits, 128 bits, or another number of bits, and the buffer stage width may similarly be 32 bits, 128 bits, or another number of bits corresponding to the internal bus width. Various ways of transferring data from an array 200 to a buffer stage via an internal bus 230 will be clear in view of this disclosure.

The PISO component 250, in the depicted embodiment, receives data via an internal data path 235 having a data path width equal to the width of the internal bus 230, and outputs the data via an output bus 260, in a series of transfers. The internal data path 235, in certain embodiments, may be substantially similar to the internal bus 230, including lines for transmitting data. In a further embodiment, however, the internal data path 235 may be in a different clock domain than the internal bus 230. For example, in one embodiment, the internal bus 230 may be in an internal clock domain controlled by the non-volatile memory element 123, and the internal data path 235 may be in an external clock domain controlled by the device controller 126. In certain embodiments, the PISO component 250 receives data from the buffer 240, or from a buffer stage via the internal data path 235. A width for the output bus 260 may be narrower than a width for the internal bus 230, and the PISO component 250 may serialize data from a buffer stage (e.g., one data transfer from the array 200 via the internal data path 235), to output the data in a series of transfers via the output bus 260. A "transfer" may refer to a unit of data transferred concurrently on a bus. For example, a "transfer" may be 16 bits of data on a 16-bit bus, 8 bits of data on an 8-bit bus, or the like. Thus, data that is transferred in one transfer on a wider bus (e.g., the internal bus 230 or the internal data path 235) may be transferred in a series of multiple transfers on a narrower bus (e.g., the output bus 260).

In one embodiment, the internal bus 230 and the internal data path 235 may have a 64 bit bus width, and the output bus 260 for the PISO component 250 may have a 16 bit bus width. For example, the PISO component 250 may receive 64 bits of data from a buffer stage, via the internal data path 235, and may output the data in four 16-bit transfers via the output bus 260. In another embodiment, the internal bus 230 and the internal data path 235 may have a bus width other than 64 bits, and the output bus 260 may have a bus width other than 16 bits. Terms such as "parallel-in serial-out," "serializing" and the like, are used herein to refer to converting from a wider bus or data width to a narrower bus or data width, and are not intended to indicate that a "serial" or "serialized" output is necessarily a one-bit data stream. For example, a PISO component 250 that converts from a 64-bit internal data path 235 to a 16-bit output bus 260 may include 16 shift registers, multiplexers, or the like, which receive four bits of data in parallel and output one bit at a time, and the whole PISO component 250 may therefore output 16 bits at a time in parallel.

In one embodiment, the PISO component 250 may output data directly onto the external bus 127, so that the output bus 260 for the PISO component 250 and the external bus 127 are equivalent. In another embodiment, the output bus 260 for the PISO component 250 may be different from the external bus 127, and another component may transfer data between the buses 260, 127. For example, in one embodiment, as described below with regard to FIG. 3, a DDR component may convert single data rate transfers on the PISO output bus 260 to double data rate transfers on the external bus 127.

In certain embodiments, the PISO component 250 may output data from a buffer stage in a series of transfers, controlled according to a clock signal. A clock signal that controls output from the PISO component 250 may be a "read enable" clock signal, and may be sent to the non-volatile memory element 123 by the device controller 126 to control or marshal a transfer of read data. The device controller 126 may generate a read enable signal, or may be in communication with clock generators, and may transfer the read enable clock signal to the non-volatile memory element 123. For example, in various embodiments, the device controller 126 may send a read command to the non-volatile memory element 123, may wait a read latency period for data to be read from the array 200 and stored in the buffer 240, ready for output by the PISO component 250, and may then send a read enable clock signal to control data transfer out from the PISO component 250.

In certain embodiments, a buffer 240 may include two or more read pointers. In general, updating a read pointer to point to a buffer stage may couple data from that stage to the PISO component 250 for output. Certain types of internal controllers 210 may transfer data from a full buffer stage to a PISO component 250 prior to outputting the data, and may use a single read pointer to couple a buffer stage to a PISO component 250. However, waiting for all the data to arrive at the PISO component 250 from a buffer stage before outputting data from the PISO component 250 may introduce latency into the output data path 150, resulting in slower reads. Thus, in the depicted embodiment, the buffer 240 includes two or more read pointers. A read pointer may correspond to a portion of a buffer stage, and the PISO component 250 may receive data from a portion of a buffer stage based on the corresponding read pointer being updated.

For example, in one embodiment, a buffer 240 may include "early" and "later" read pointers, corresponding to "early" and "later" portions of buffer stages. To output data from a buffer stage, the internal controller 210 may couple the "early" portion of the buffer stage to the PISO component 250 by updating the early read pointer to point to the buffer stage, and may couple the "later" portion of the buffer stage to the PISO component 250 by updating the "later" read pointer to point to the buffer stage. As another example, a buffer 240 may include three or more read pointers corresponding to three or more portions of buffer stages, and the internal controller 210 may couple each portion of a buffer stage to the PISO component 250 by updating the corresponding read pointer.

In certain embodiments, multiple read pointers for the buffer 240 may be updated by the internal controller 210 at different times, in response to different portions of a clock signal, such as the read enable clock signal from the device controller 126. For example, the internal controller 210 may update one read pointer in response to a first pulse of the read enable clock signal, and may update another read pointer in response to a second, third, or fourth pulse of the read enable clock signal. Updating multiple read pointers at different times may reduce latency for the output data path by allowing the internal controller 210 to prefetch data, allowing the PISO component 250 to begin outputting data before receiving all the data from a buffer stage, or the like. Read pointers are described in further detail below with regard to FIGS. 4-6.

Figure 3:
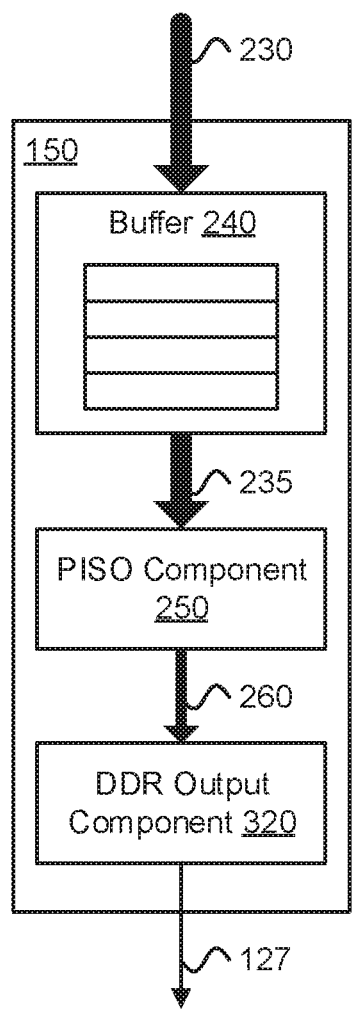
FIG. 3 is a schematic block diagram illustrating another embodiment of an output data path.

FIG. 3 depicts another embodiment of an output data path 150. The output data path 150 may be substantially similar to the output data path 150 described above with regard to FIG. 2, including a buffer 240 and a PISO component 250 substantially as described above. In the depicted embodiment, the output data path 350 further includes a double data rate (DDR) output component 320.

In certain embodiments, a DDR output component 320 may receive data from the PISO component 250 via the output bus 260 or PISO output lines, and may output the data via the I/O pads 270 and the external bus 127, using double data rate signaling. In various embodiments, a DDR output component 320 may output two transfers per clock cycle (e.g., for a read enable clock signal received by the non-volatile memory element 123 from the device controller 126). For example, in one embodiment, the PISO component 250 may receive 64 bits from a buffer stage, and may output the 64 bits in a series of four 16-bit transfers. In a further embodiment, the DDR output component 320 may output 16 bits from the PISO component 250 in one cycle of the clock signal, using 8 input-output pads 270 of the non-volatile memory element 123. For example, the DDR output component 320 may output eight bits in response to a rising edge of the clock signal, and may output eight more bits in response to a falling edge of the clock signal. Various further ways to use a DDR output component 320 to output data using double data rate signaling will be clear in view of this disclosure.

Figure 4:
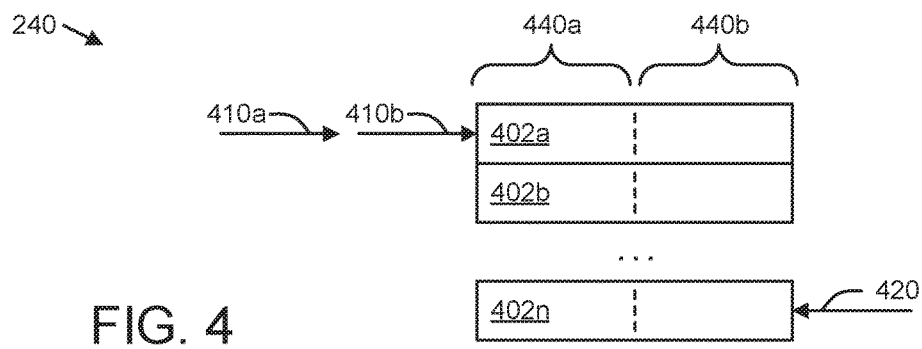
FIG. 4 is a schematic block diagram illustrating one embodiment of a buffer, at a first time.
Figure 5:
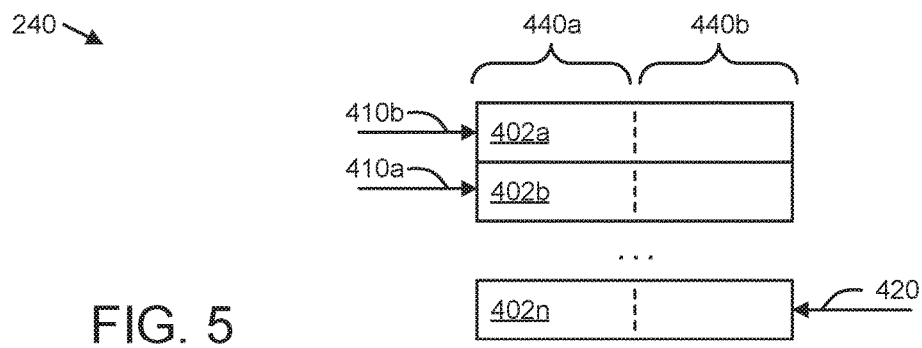
FIG. 5 is a schematic block diagram illustrating the buffer of FIG. 4, at a second time.
Figure 6:
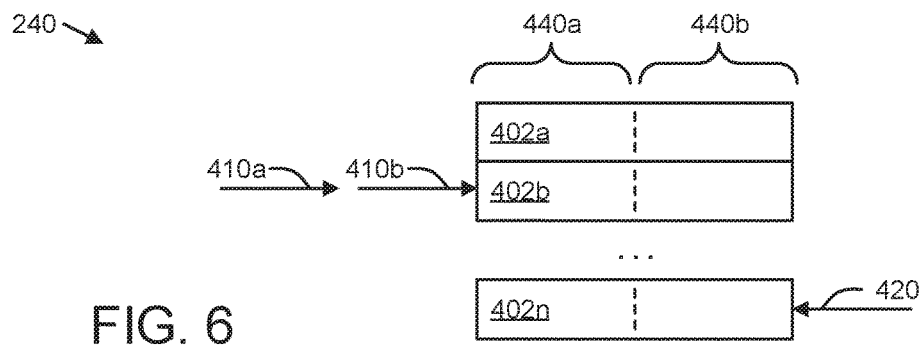
FIG. 6 is a schematic block diagram illustrating the buffer of FIG. 4, at a third time.

FIGS. 4-6 depict one embodiment of a buffer 240, at different times. The buffer 240 may be substantially as described above with regard to FIGS. 1-3, and includes buffer stages 402 and read pointers 410, substantially as described above. In the depicted embodiment, the buffer 240 further includes a write pointer 420.

As described above, a buffer stage 402 may be a row or other array of latches, flip-flops, or other data storage components that receive data from the internal bus 230 in parallel. In certain embodiments, a buffer stage width (e.g., a number of bits stored per buffer stage 402) may be a width of the internal bus 230 for the non-volatile memory element 123. For example, a 64 bit wide buffer stage 402 may include 64 latches. In various embodiments, widths of internal buses 230 and corresponding buffer stage widths may vary based on factors such as storage operation granularity, available die area, and the like. In the depicted embodiment, the buffer 240 includes a plurality of buffer stages 402a-n. In various embodiments, buffers 240 may include various numbers of buffer stages 402, depending on factors such as available die area, speed differences for the internal bus 230 and the external bus 127, storage operation granularity, and the like.

In the depicted embodiment, the buffer 240 includes a write pointer 420. In various embodiments, a write pointer 420 may be, or may include, any hardware that indicates which buffer stage 402 is coupled to the internal bus 230 to receive and buffer data from the array 200. The write pointer 420 may be referred to as "pointing" to the buffer stage 402 that it indicates. In one embodiment, a write pointer 420 may comprise a component such as a one-hot ring counter, with binary output lines coupled to the buffer stages 402 so that a "1" output on one line enables latches in a buffer stage 402 to receive and store data, and so that a "0" output for the other output lines prevents latches in the other buffer stages 402 from receiving data. For example, a buffer stage 402 may be a row of latches, and a binary output line for the write pointer 420 may be coupled to "enable" inputs for that buffer stage 402, so that the buffer stage 402 is enabled to receive data when that binary output line is high, and continues to store its previous value when the binary output line is low. In another embodiment, a write pointer 420 may indicate a buffer stage 402 in another way. For example, in one embodiment, a write pointer 420 may comprise a register, or other data storage component, and the internal controller 210 may refer to a stored number and write data to a buffer stage 402 corresponding to the stored number, or may update the stored number so that the write pointer 420 points to a different buffer stage 402. Various ways of implementing a write pointer 420 will be clear in view of this disclosure.

In certain embodiments, the buffer 240 may include two or more read pointers 410. A read pointer 410 may be similar to a write pointer 420, in that it indicates or "points to" a buffer stage 402, and may include similar hardware such as a ring counter that outputs a "1" for one buffer stage 402 at a time and a "0" for other buffer stages 402, a register or other data storage component that stores a number, or the like. However, a read pointer 410 may point to a buffer stage 402 that is coupled (or at least partially coupled) to the PISO component 250, so that the PISO component 250 receives data from the indicated buffer stage 402. In a buffer 240 with one read pointer 410, the buffer stage 402 indicated by the read pointer 410 would be coupled to the PISO component 250. For example, if a buffer stage 402 is a row of latches, a binary output line from a read pointer 410 may be coupled to control gates for transistors that couple or decouple latch outputs in the row to/from input lines for the PISO component 250. Alternatively, the read pointer 410 may store a number, and the internal controller 210 may refer to the stored number and read data from a buffer stage 402, or may update the stored number so that the read pointer 410 points to a different buffer stage 402.

In the depicted embodiment, the buffer stages 402 are divided into portions 440, corresponding to the number of read pointers 410. For example, in the depicted embodiment, the buffer 240 includes an early read pointer 410a and a later read pointer 410b, and the buffer stages 402 are divided into early portions 440a and later portions 440b. The early portion 440a of each buffer stage 402 is depicted on the left side, and the later portion 440b on the right side of the buffer stage 402. A dotted line represents a boundary between portions 440 for the buffer stages 402.

The terms "early" and "later" are used for convenience in referring to the two different read pointers 410, and to corresponding portions 440 of buffer stages 402, based on the order in which the read pointers 410 are updated. These terms are used for convenience in naming read pointers 410 and portions 440 of buffer stages 402, and are not intended as limiting. In the depicted embodiment, the buffer 240 includes two read pointers 410, and two buffer stage portions 440 in each buffer stage 402. In another embodiment, a buffer 240 may include three portions 440 per buffer stage 402, corresponding to three read pointers 410, four portions 440 per buffer stage 402, corresponding to four read pointers 410, or the like In various embodiments, the PISO component 250 may receive data from a portion 440 of a buffer stage 402 in response to the internal controller 210 updating a read pointer 410 to point to the buffer stage 402. With multiple read pointers 410, in various embodiments, a read pointer 410 may couple a portion 440 of a buffer stage 402 to the PISO component 250, instead of coupling a full buffer stage 402 to the PISO component 250. For example, if a buffer stage 402 is a row of latches, a portion 440 may be half of a row, a third of the row, a fourth of the row, or the like (depending on the number of read pointers 410), and a binary output from a read pointer 410 may be coupled to control gates for transistors that couple or decouple latch outputs in that half (or third or fourth) of the row to/from input lines for the PISO component 250. Alternatively, the read pointer 410 may store a number referring to a buffer stage 402, and the internal controller 210 may refer to the stored number and read data from a portion 440 of the buffer stage 402.

In certain embodiments, a PISO component 250 may include a number of PISO input lines equal to the width of the internal bus 230 or of a buffer stage 402, and a number of PISO output lines equal to the width of the output bus 260. Accordingly, the PISO component 250 may include more PISO input lines than PISO output lines. In a further embodiment, the internal controller 210 may couple a subset of the PISO input lines to a portion 440 of a buffer stage 402 by updating a read pointer 410 to point to the buffer stage 402. For example, the internal controller 210 may couple an early portion 440a of a buffer stage 402 to a first subset of the PISO input lines by updating the early read pointer 410a to point to the buffer stage 402, and may couple a later portion 440b of the buffer stage 402 to a second subset of the PISO input lines by updating the later read pointer 410b to point to the buffer stage 402.

In certain embodiments, the buffer 240 may be a first-in first-out (FIFO) buffer that maintains an order for the data, so that data for read operations is stored in the buffer stages 402 in the order in which it was received from the array 200, and is sent to the PISO component 250 in the same order. For example, the write pointer 420 may increment to point to successive buffer stages 402, so that the buffer 240 stores data in order, and the read pointers 410 may be similarly incremented to point to buffer stages 402 in order. In a further embodiment the buffer 240 may be an asynchronous first-in-first-out (AFIFO) buffer that updates based on two independent clock signals. For example, the write pointer 420 may be updated based on a clock signal for the internal bus 230, and the read pointers 410 may be updated based on another clock signal, such as a read enable clock signal sent by the device controller 126. In a further embodiment, the internal clock signal may be independent of the read enable clock signal. An AFIFO buffer 240 may transfer data between two different clock domains by receiving data in a first clock domain, such as an internal clock domain for the internal bus 230 between the array 200 and the buffer 240, and by outputting data in a second clock domain, such as an external clock domain controlled by the device controller 126 for the internal data path 235 between the buffer 240 and the PISO component 250.

Pointers 410, 420, in various embodiments, may update based on clock signals in various ways. In one embodiment, pointers 410, 420 may be ring counters, and clock signals may be coupled to ring counter clock inputs for updating the ring counters). In another embodiment, where pointers 410, 420 store a numeric value, the internal controller 210 may update the numeric value in response to a portion of a clock signal, such as a rising edge, a peak, a falling edge, or a trough.

In certain embodiments, the internal controller 210 may update the two or more read pointers 410 at different times in response to different portions of a clock signal, such as a read enable clock signal. Different portions of a clock signal may be different events within the clock signal, such as a rising edge and a falling edge, or may be similar events that occur at different times, such as a rising edge for an earlier pulse and a rising edge for a later pulse. In various embodiments, the internal controller 210 may generate one or more intermediate clock signals to update different read pointers 410 at different times based on different portions of a read enable (or other) clock signal. For example, an internal controller 210 may include clock dividers, delay circuits, or the like to generate two different intermediate clock signals, to update different read pointers 410 at different times.

FIG. 4-6 provide an example, depicted at subsequent points in time, of coupling portions 440 of buffer stages 402 to the PISO component 250 by updating read pointers 410. In the depicted embodiment, the write pointer 420 points to buffer stage 402n, indicating that earlier buffer stages 402a, 402b and so on have already received data from the array 200, and that the next transfer of data from the array 200 via the internal bus 230 will be buffered by buffer stage 402n. In FIG. 4, the early read pointer 410a and the later read pointer 410b both point to the first buffer stage 402a, indicating that both the first portion 440a and the second portion 440b of the first buffer stage 402a are coupled to the PISO component 250. In FIG. 4, the PISO component 250 may be in the process of outputting the data from the first buffer stage 402a in a series of transfers, or may have already completed a series of transfers for outputting the data from the first buffer stage 402a. Updating the read pointers 410 will couple portions 440 of the second buffer stage 402b to the PISO component 250.

FIG. 5 depicts the buffer 240, in the embodiment depicted in FIG. 4, but at a subsequent time. In response to a portion of a read enable clock signal, such as a first pulse in a series of clock pulses, the internal controller 210 has updated the early read pointer 410a to point to the second buffer stage 402b. Accordingly, the early portion 440a of the second buffer stage 402b is coupled to the PISO component 250. The later read pointer 410b has not been updated, and the later portion 440b of the first buffer stage 402a remains coupled to the PISO component 250.

In one embodiment, the internal controller 210 may update an early read pointer 410a to point to another buffer stage 402 (e.g. the second buffer stage 402b), while the PISO component 250 is in the process of outputting data from the later portion 440b of a buffer stage 402 (e.g., the first buffer stage 402a). Updating one read pointer 410 to point to a subsequent buffer stage 402, while another read pointer 410 continues to point to a buffer stage 402 from which the PISO component 250 is outputting data, may lower latency by making data from the subsequent buffer stage 402 available at the PISO component 250 earlier than it would otherwise be available.

In a further embodiment, the PISO component 250 may begin outputting data from a buffer stage 402 before receiving data from at least one portion 440 of the buffer stage 402. For example, in the depicted embodiment in FIG. 5, the PISO component 250 receives data from the early portion 440a of the second buffer stage 402b, and may begin outputting that data before receiving data from the later portion 440b of the second buffer stage 402b. A PISO component 250 that outputs data from a portion 440 of a buffer stage 402 before receiving data from other portions 440 of a buffer stage 402 may increase throughput and decrease latency compared to PISO hardware that receives data from an entire buffer stage 402 before outputting the data.

FIG. 6 depicts the buffer 240 of FIGS. 4 and 5 at a later point in time. In response to a portion of a read enable clock signal, the internal controller 210 has updated the later read pointer 410b to point to the second buffer stage 402b. In certain embodiments, the portion of the read enable clock signal that triggers the internal controller 210 to update the later read pointer 410b may be different from the portion of the read enable clock signal that triggered the internal controller 210 to update the early read pointer 410a. For example, a first clock pulse in a series of clock pulses may trigger the internal controller 210 to update the early read pointer 410a, and a second, third, fourth, or other subsequent pulse may trigger the internal controller 210 to update the later read pointer 410b.

Because the later read pointer 410b points to the second buffer stage 402b in FIG. 6, the later portion 440b of the second buffer stage 402b is coupled to the PISO component 250. With both read pointers 410 pointing to the second buffer stage 402b, both the early portion 440a and the later portion 440b of the second buffer stage 402b are coupled to the PISO component 250, and the PISO component 250 may complete a series of transfers for outputting the data of the second buffer stage 402b.

Figure 7:
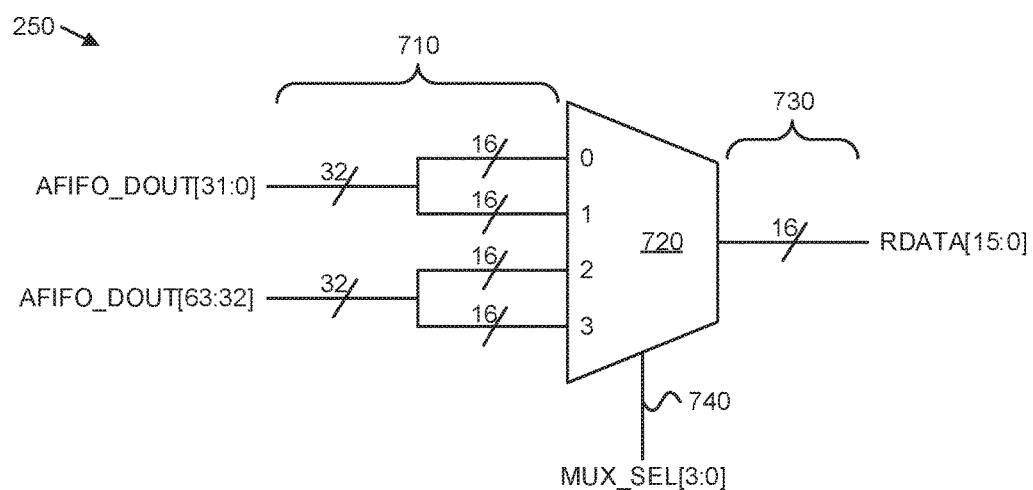
FIG. 7 is a circuit diagram illustrating one embodiment of a parallel-in serial-out (PISO) component.

FIG. 7 depicts a circuit diagram for one embodiment of a PISO component 250, which may be substantially similar to the PISO component 250 described above with reference to FIGS. 2-6. In the depicted embodiment, the PISO component 250 comprises a set of multiplexers 720.

A multiplexer 720, in various embodiments, may refer to a component or circuit with multiple input lines 710, a single output line 730, and one or more select lines 740. The output line 730 may be coupled to a signal from one of the input lines 710, or may output a data value from one of the input lines 710, and the select lines 740 may be used to control which input line 710 is coupled to the output line 730. For example, a 4-to-1 multiplexer 720 may have four input lines 710 and one output line 730, and an 8-to-1 multiplexer 720 may have eight input lines 710 and one output line 730. Various types of multiplexers 720 will be clear in view of this disclosure.

In the depicted embodiment, the PISO component 250 includes a set of sixteen 4-to-1 multiplexers 720. In the circuit diagram of FIG. 7, numbered slashes indicate parallel electrical lines, so while one multiplexer 720 is depicted for convenience in illustration, an embodiment of a PISO component 250 may include sixteen multiplexers 720 corresponding to the sixteen output lines 730. PISO output lines 730 may refer to the output lines 730 for the PISO component 250. In the depicted embodiment, the PISO output lines 730 comprise the collection of output lines 730 for the multiplexers 720. Similarly, PISO input lines 710 may refer to the input lines 710 for the PISO component 250. In the depicted embodiment, the PISO input lines 710 comprise the collection of input lines 710 for the multiplexers 720. In the depicted embodiment, therefore the PISO component 250 includes 64 PISO input lines 710, and 16 PISO output lines 730. In another embodiment, a PISO component 250 may include a different number of PISO input lines 710, a different number of multiplexers 720, and/or a different number of PISO output lines 730, depending on desired bus widths.

The select lines 740, in various embodiments, control output from the multiplexers 720. The internal controller 210 may activate one of four select lines 740 at once, to select which input lines 710 are coupled to the output lines 730. In the depicted embodiment, the internal controller 210 sets and updates read pointers 410 to couple portions 440 of buffer stages 402 to subsets of the PISO input lines 710. For example, the PISO component 250 may receive data from an early portion 440a of a buffer stage 402 in response to the internal controller 210 updating the early read pointer 410a to point to that buffer stage 402, and may receive data from a later portion 440b of a buffer stage 402 in response to the internal controller 210 updating the later read pointer 410b.

In the depicted embodiment, the buffer stages 402, the internal bus 230, and the internal data path 235 are 64 bits wide, the early portion 440a of a buffer stage 402 includes 32 bits (labeled AFIFO_DOUT[31:0] in FIG. 7), and the later portion 440b of a buffer stage 402 includes 32 more bits (labeled AFIFO_DOUT[63:32] in FIG. 7). In the depicted embodiment, the internal controller 210 couples the early portion 440a of a buffer stage 402 to a first subset of 32 PISO input lines 710 by updating the early read pointer 410a. The internal controller 210 couples the later portion 440b of a buffer stage 402 to a second subset of 32 PISO input lines 710 by updating the later read pointer 410b. The PISO component 250 may output the data of the buffer stage 402 in a series of four 16-bit data transfers (labelled RDATA [15:0] in FIG. 7). In the depicted embodiment, the PISO component 250 outputs sixteen bits from input 0 of the multiplexers 720 in response to the internal controller 210 activating a first select line 740, outputs sixteen bits from input 1 of the multiplexers 720 in response to the internal controller 210 activating a second select line 740, outputs sixteen bits from input 2 of the multiplexers 720 in response to the internal controller 210 activating a third select line 740, and outputs sixteen bits from input 3 of the multiplexers 720 in response to the internal controller 210 activating a fourth select line 740.

In certain embodiments, the internal controller 210 may update the select lines 740 for the multiplexers 720 based on a clock signal, such as the read enable clock signal from the device controller 126. A series of data transfers output by the PISO component 250 may include one data transfer (e.g., 16 bits in the depicted embodiment) per clock cycle of the read enable clock. Accordingly, the internal controller 210 may control select lines 740 so that a different select line 740 is active in each clock cycle. For example, the internal controller 210 may include a four-output, one-hot ring counter coupled to the select lines 740, with a clock line coupled to the read enable clock signal.

In a further embodiment, the internal controller 210 may update the read pointers 410 based on the same clock signal for updating the select lines 740, such as the read enable clock signal from the device controller 126. The internal controller 210 may update the read pointers 410 so that data from a buffer stage 402 is ready at an input line 710 of a multiplexer 720 in time to be output by activation of the corresponding select line 740. For example, the internal controller 210 may update an early read pointer 410a to point to a buffer stage 402 so that data from the early portion 440a of the buffer stage 402 is ready at a first subset of PISO input lines 710 (e.g., multiplexer inputs 0 and 1) in time to be output by activating first and second select lines 740, and may update a later read pointer 410b to point to a buffer stage 402 so that data from the later portion 440b of the buffer stage 402 is ready at a second subset of PISO input lines 710 (e.g., multiplexer inputs 2 and 3) in time to be output by activating third and fourth select lines 740.

In certain embodiments, a PISO component 250 based on multiplexers 720 may receive data from one buffer stage 402 while outputting data of another buffer stage 402. For example, the internal controller 210 may update the early read pointer 410a to couple an early portion 440a of a buffer stage 402 to a first subset of the PISO input lines 710, while the PISO component 250 is still outputting data from a later portion 440b of a previous buffer stage 402. In the depicted embodiments, lines coupled to multiplexer inputs 0 and 1 could be updated while the select lines 740 were active for outputting data from multiplexer input 2 or 3, and lines coupled to multiplexer inputs 2 and 3 could be updated while the select lines 740 were active for outputting data from multiplexer input 0 or 1.

In a further embodiment, a PISO component 250 based on multiplexers 720 may begin outputting data from a buffer stage 402 before receiving data from at least one portion 440 of a buffer stage 402. For example, with the early read pointer 410a updated to couple an early portion 440a of a buffer stage 402 to multiplexer inputs 0 and 1, the internal controller 210 may activate first or second select lines 740 to begin outputting data from the PISO component 250, even if the later read pointer 410b has not yet been updated to couple a later portion 440b of a buffer stage 402 to multiplexer inputs 2 and 3. By contrast, using a single read pointer to couple a full buffer stage 402 to a PISO component 250 may result in higher latency between loading data for the PISO component 250 and beginning output transfers, with no prefetching or early outputting.

In the depicted embodiment, a first read pointer 410a couples data to a first half of the PISO input lines 710, and a second read pointer 410b couples data to a second half of the PISO input lines 710. In another embodiment, four read pointers 410 may couple data to corresponding fourths of the PISO input lines 710. Various further embodiments, including various numbers of read pointers 410 corresponding to portions 440 of buffer stages 402 and to subsets of PISO input lines 710, will be clear in view of this disclosure.

Figure 8:
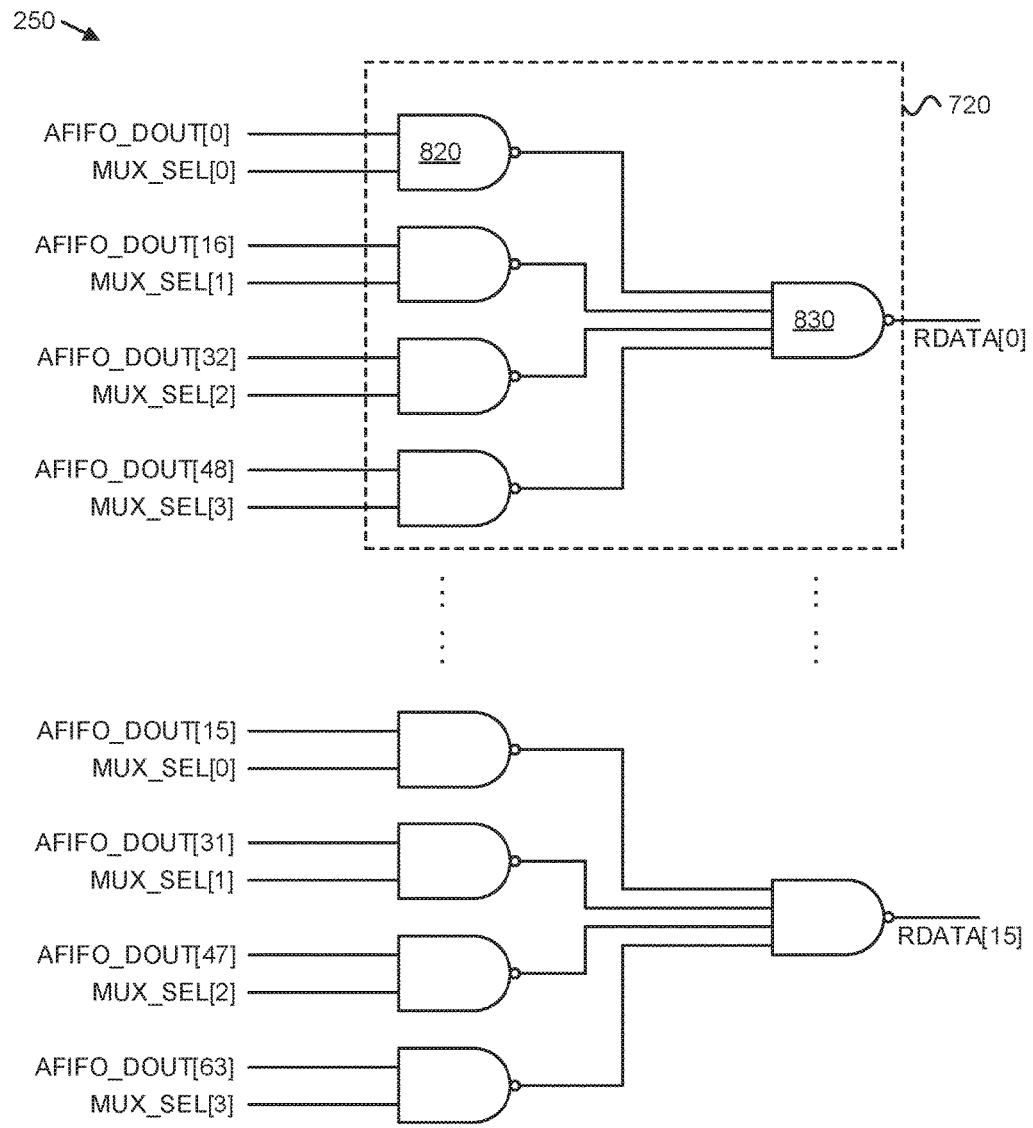
FIG. 8 is a circuit diagram illustrating another embodiment of a PISO component.

FIG. 8 depicts a circuit diagram for another embodiment of a PISO component 250. In the depicted embodiment, the PISO component 250 may be substantially as described above with reference to FIGS. 2-7, including a set of multiplexers 720. In the depicted embodiment, the set of multiplexers 720 include one or more NAND gate based multiplexers 720.

A NAND gate based multiplexer 720 includes a set of input NAND gates 820, and an output NAND gate 830 (which may have more than two input lines, corresponding to the number of input NAND gates 820). In the depicted embodiment, a 4-to-1 multiplexer 720 includes four input NAND gates 820. Each input NAND gate 820 is coupled to an input line 710 (e.g., in FIG. 8, bits from a buffer stage 402 are labeled AFIFO_DOUT), and to a select line 740 (labeled MUX_SEL[0] through MUX_SEL[3] in FIG. 8). An input NAND gate 820 outputs a 1 if its select line 740 is set to 0, and inverts the value at its input line 710 if its select line 740 is set to 1. Thus, with one out of four select lines 740 set to 1, an output NAND gate 830 receives three is corresponding to unselected input lines 710, and one inverted value corresponding to the selected input line 710. The output NAND gate 830 therefore re-inverts (or de-inverts) the inverted value, and outputs a single value corresponding to the selected input line 710.

In the depicted embodiment, a buffer stage 402 includes 64 bits. Bits 0-15 are coupled to first input NAND gates 820 for the set of multiplexers 720, and are output when MUX_SEL[0] is selected. Bits 16-31 are coupled to second input NAND gates 820 for the set of multiplexers 720, and are output when MUX_SEL[1] is selected. Bits 32-47 are coupled to third input NAND gates 820 for the set of multiplexers 720, and are output when MUX_SEL[2] is selected. Lastly, bits 48-63 are coupled to fourth input NAND gates 820 for the set of multiplexers 720, and are output when MUX_SEL[3] is selected.

In a certain embodiment, routing for lines for the set of multiplexers 720 may be configured based on an output skew specification for the PISO component 250. Output skew, in various embodiments, may be measurement of a time difference between output lines 730 updating. For example, if a select line 740 is updated for a set of sixteen multiplexers 720, the time difference between the outputs updating for the fastest and slowest multiplexers 720 may be an output skew. An output skew specification may be a threshold or limit specified (e.g., by a manufacturer of a non-volatile memory element 123) for an output skew. For example, an output skew specification may specify an output skew of less than 0.1 nanoseconds for a set of multiplexers 720. Lines such as input lines 710, output lines 730, select lines 740, and internal lines (e.g., between input NAND gates 820 and output NAND gates 830) may be routed by a manufacturer to equalize delays and to reduce output skew to within a specification. Complying with an output skew specification may facilitate signaling at increasingly fast clock rates. For example, in one embodiment, a set of multiplexers 720 with an output skew less than 0.1 ns may output data at a rate of 1 GB/s, or more.

Figure 9:
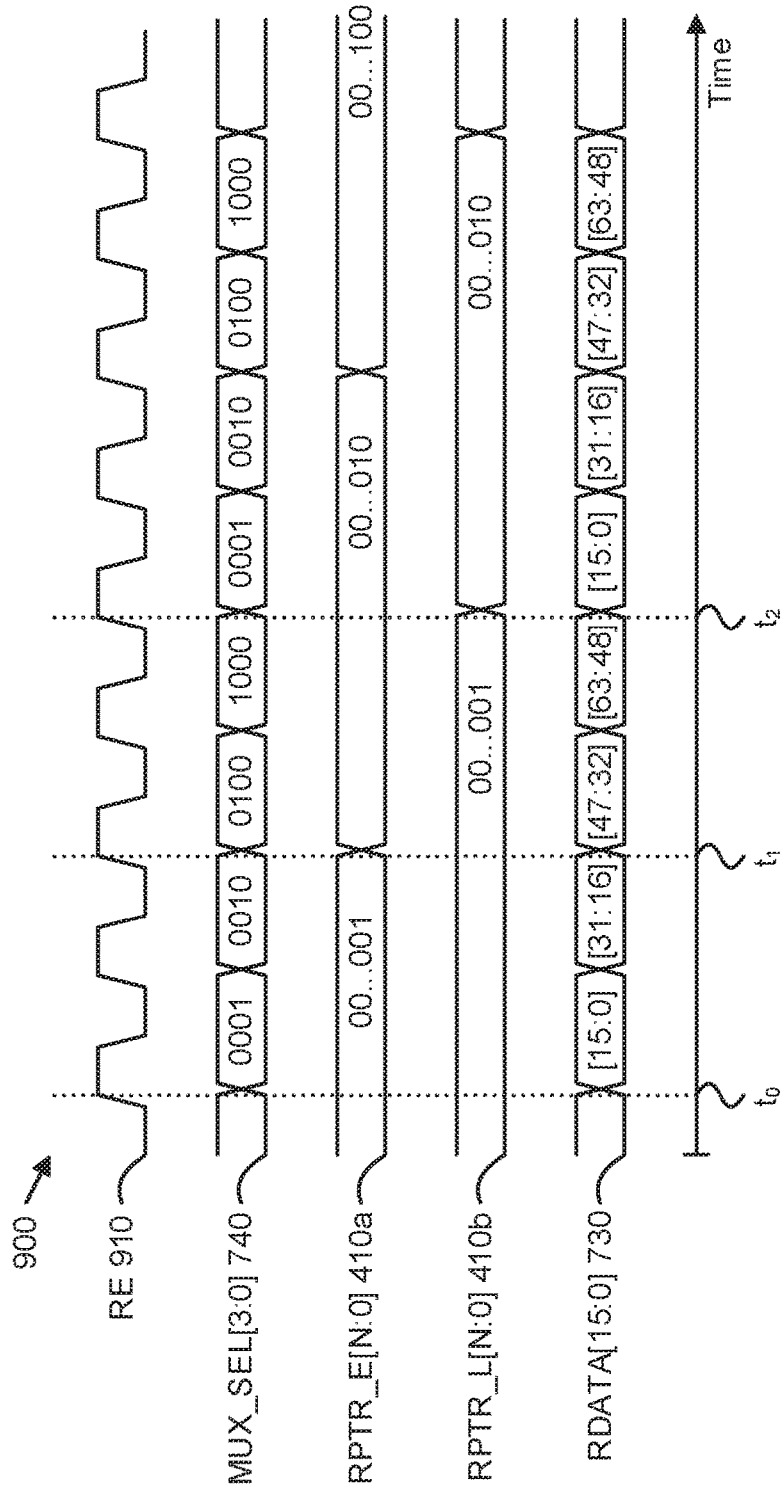
FIG. 9 is a timing diagram illustrating read pointers updating based on a clock signal, in one embodiment.

FIG. 9 is a timing diagram 900 illustrating read pointers 410 updating based on a clock signal 910, in one embodiment. In one embodiment, the clock signal 910 is a read enable clock signal sent by a device controller 126. In certain embodiments, a clock cycle for the read enable clock signal 910 may be less than or equal to three nanoseconds. One clock cycle per three nanoseconds may be equivalent to 333 MHz, which may be equivalent to 666 MB/s with 16 bits output per clock cycle. The timing diagram further depicts select lines 740 (four bits, to select one of four inputs for the multiplexers 720), early and later read pointers 410 (N bits, to select one of N buffer stages 402), and data output at PISO output lines 730.

At time $t_0$, a first pulse of the clock signal 910 is received. The early and later read pointers 410 both point to a first buffer stage 402a, indicated by a 1 in the last bit of the read pointers 410. Accordingly, early and later portions 440 of the first buffer stage 402a are coupled to PISO input lines 710. In response to the first pulse of the clock signal 910, the internal controller 210 activates a first select line 740 (e.g., MUX_SEL[0]), and the PISO component 250 outputs bits 0-15 of the first buffer stage 402a. In response to a second pulse of the clock signal 910, the internal controller 210 activates a second select line 740 (e.g., MUX_SEL[1]), and the PISO component 250 outputs bits 16-31 of the first buffer stage 402a.

At time $t_1$, a third pulse of the clock signal 910 is received. In response to the third pulse of the clock signal 910, the internal controller 210 updates the early read pointer 410a to point to an early portion 440a (e.g., bits 0-31) of a second buffer stage 402b. Also, in response to the third pulse of the clock signal 910, the internal controller 210 activates a third select line 740 (e.g., MUX_SEL[2]), and the PISO component 250 outputs bits 32-47 of the first buffer stage 402a. In response to a fourth pulse of the clock signal 910, the internal controller 210 activates a fourth select line 740 (e.g., MUX_SEL[3]), and the PISO component 250 outputs bits 48-63 of the first buffer stage 402a.

At time $t_2$, a fifth pulse of the clock signal 910 is received. In response to the fifth pulse of the clock signal 910, the internal controller 210 updates the later read pointer 410b to point to a later portion 440b (e.g., bits 32-63) of a second buffer stage 402b. Also, in response to the fifth pulse of the clock signal 910, the internal controller 210 activates a first select line 740 (e.g., MUX_SEL[0]), and the PISO component 250 outputs bits 0-16 of the second buffer stage 402b. In response to a sixth pulse of the clock signal 910, the internal controller 210 activates a second select line 740 (e.g., MUX_SEL[2]), and the PISO component 250 outputs bits 16-31 of the second buffer stage 402b.

The pulses of the clock signal 910 continue, and the internal controller 210 continues to update different read pointers 410 at different times, to make data available at PISO input lines 710. The internal controller 210 also continues to control select lines 740 based on the clock signal 910, to output the data via PISO output lines 730.

Figure 10:
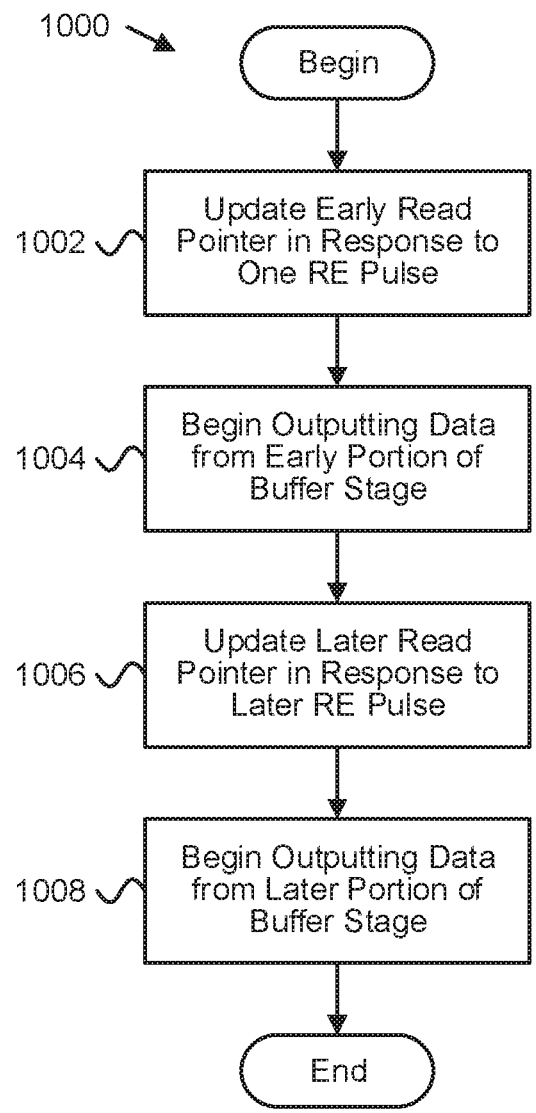
FIG. 10 is a schematic flow chart diagram illustrating one embodiment of a method for outputting data for non-volatile memory.

FIG. 10 is a schematic flow chart diagram illustrating one embodiment of a method 1000 for outputting data for non-volatile memory. The method 1000 begins, and an internal controller 210 updates 1002 an early read pointer 410a in response to one pulse of a read enable clock signal. The PISO component 250 begins 1004 outputting data from an early portion 440a of a buffer stage 402. The internal controller 210 updates 1006 a later read pointer 410b in response to a later pulse of a read enable clock signal. The PISO component 250 begins 1008 outputting data from a later portion 440b of the buffer stage 402, and the method 1000 ends. The method 1000 may be repeated for subsequent buffer stages 402

A means for buffering output data of a non-volatile memory element 123 in buffer stages 402 of a buffer stage width, in various embodiments, may include a plurality of buffer stages 402, a buffer 240, an output data path 150, an internal controller 210, or a set of latches, registers or other data-storing elements, and/or other logic hardware. Other embodiments may include similar or equivalent means for buffering output data.

A means for outputting data at an output data width narrower than the buffer stage width, in various embodiments, may include a PISO component 250, an output data path 150, an internal controller 210, a set of multiplexers 720, NAND gates 820, 830, and/or other logic hardware. Other embodiments may include similar or equivalent means for outputting data.

A means for coupling buffer stage portions 440 to the means for outputting data, in various embodiments, may include two or more read pointers 410, an output data path 150, an internal controller 210, PISO input lines 710, and/or other logic hardware. Other embodiments may include similar or equivalent means for coupling buffer stage portions 440 to the means for outputting data.

A means for updating two or more read pointers 410 at different times in response to different portions of a clock signal, in various embodiments, may include two or more read pointers 410, an output data path 150, an internal controller 210, one or more clock dividers, one or more counters, and/or other logic hardware. Other embodiments may include similar or equivalent means for coupling read pointers 410.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
a buffer for output data of a non-volatile memory element, the buffer comprising:
a plurality of buffer stages, wherein a buffer stage width is a width of an internal bus for the non-volatile memory element; and
two or more read pointers, wherein an internal controller for the non-volatile memory element updates the two or more read pointers at different times in response to different portions of a clock signal; and
a parallel-in serial-out (PISO) component that receives data via an internal data path having a data path width equal to the internal bus width, and outputs the data in a series of transfers controlled according to the clock signal, via an output bus having an output bus width narrower than the internal bus width, wherein the PISO component receives data from a portion of a buffer stage in response to the internal controller updating a read pointer to point to the buffer stage.

2. The apparatus of claim 1, wherein the two or more read pointers comprise an early read pointer and a later read pointer, such that the PISO component receives data from an early portion of the buffer stage in response to the internal controller updating the early read pointer to point to the buffer stage, and receives data from a later portion of the buffer stage in response to the internal controller updating the later read pointer to point to the buffer stage.

3. The apparatus of claim 2, wherein the internal controller updates the early read pointer to point to another buffer stage while the PISO component is outputting data from the later portion of the buffer stage.

4. The apparatus of claim 1, wherein the PISO component begins outputting data from the buffer stage before receiving data from at least one portion of the buffer stage.

5. The apparatus of claim 1, wherein the clock signal comprises a read enable clock signal received by the non-volatile memory element.

6. The apparatus of claim 5, wherein the buffer comprises an asynchronous first-in-first-out (AFIFO) buffer that updates based on the read enable clock signal and an internal clock signal for the non-volatile memory element, the internal clock signal independent of the read enable clock signal.

7. The apparatus of claim 1, wherein the PISO component comprises a set of multiplexers.

8. The apparatus of claim 7, wherein select lines for the set of multiplexers are controlled based on the clock signal.

9. The apparatus of claim 7, wherein the set of multiplexers comprises one or more NAND gate based multiplexers.

10. The apparatus of claim 7, wherein routing of lines for the set of multiplexers is configured based on an output skew specification for the PISO component.

11. The apparatus of claim 1, wherein the internal bus width comprises a 64 bit bus width, and the output bus width for the PISO component comprises a 16 bit bus width.

12. The apparatus of claim 10, further comprising a double data rate (DDR) output component that outputs 16 bits from the PISO component in one cycle of the clock signal, using 8 input-output pads of the non-volatile memory element.

13. The apparatus of claim 1, wherein a clock cycle for the clock signal is less than or equal to three nanoseconds.

14. A system comprising:
one or more non-volatile memory elements, a non-volatile memory element comprising:
a plurality of buffer stages for output data of the non-volatile memory element;
a parallel-in serial-out (PISO) component that receives data from a buffer stage via PISO input lines and outputs the data in a series of transfers controlled according to a read enable clock signal, via PISO output lines, wherein the PISO component comprises more PISO input lines than PISO output lines; and
an early read pointer and a later read pointer, wherein an internal controller for the non-volatile memory element updates the early read pointer and the later read pointer in response to different portions of the read enable clock signal, such that the internal controller couples an early portion of the buffer stage to a first subset of the PISO input lines by updating the early read pointer to point to the buffer stage, and couples a later portion of the buffer stage to a second subset of the PISO input lines by updating the later read pointer to point to the buffer stage.

15. The system of claim 14, wherein the PISO component comprises a set of multiplexers.

16. The system of claim 15, wherein the internal controller controls select lines for the set of multiplexers based on the read enable clock signal.

17. The system of claim 14, wherein the PISO component comprises 64 PISO input lines and 16 PISO output lines.

18. The system of claim 14, wherein an asynchronous first-in-first-out (AFIFO) buffer comprises the plurality of buffer stages, the AFIFO buffer updating based on the read enable clock signal and an internal clock signal for the non-volatile memory element, the internal clock signal independent of the read enable clock signal.

19. An apparatus comprising:
means for buffering output data of a non-volatile memory element in buffer stages of a buffer stage width;
means for outputting data at an output data width narrower than the buffer stage width in a series of transfers controlled according to a clock signal, the data received from a portion of a buffer stage of the buffer stages in response to an internal controller for the non-volatile memory element updating a read pointer to point to the buffer stage; and
means for coupling buffer stage portions to the means for outputting data, the means for coupling comprising two or more read pointers, the internal controller updating the two or more read pointers at different times in response to different portions of the clock signal.

* * * * *